United States Patent
Wurzbacher

[11] 3,906,793
[45] Sept. 23, 1975

[54] FLOW METER
[75] Inventor: Frank Wurzbacher, Hoisbuttel, Germany
[73] Assignee: The British Petroleum Company Limited, London, England
[22] Filed: Oct. 26, 1973
[21] Appl. No.: 410,162

[30] Foreign Application Priority Data
Nov. 16, 1972 Germany............................ 2256120

[52] U.S. Cl................................... 73/269; 73/270
[51] Int. Cl.² ........................................ G01F 11/08
[58] Field of Search .................... 73/239, 262–271

[56] References Cited
UNITED STATES PATENTS

| 117,094 | 7/1871 | Mead | 73/270 |
| 132,496 | 10/1972 | Spooner | 73/270 |
| 3,181,360 | 5/1965 | Hederhorst | 73/270 |
| 3,234,785 | 2/1966 | Rimsha | 73/269 X |
| 3,344,667 | 10/1967 | Maltby | 73/239 |
| 3,657,925 | 4/1972 | Gross | 73/239 |

Primary Examiner—Herbert Goldstein
Attorney, Agent, or Firm—Morgan, Finnegan, Pine, Foley & Lee

[57] ABSTRACT

A flowmeter has a reciprocating membrane displacement unit and is fitted with an impulse transmitter. The impulse transmitter produces pulses which are counted by a counting mechanism, the number of pulses being dependent upon the position of the displacement unit. Further the impulse transmitter produces a plurality of impulses per stroke of the displacement unit, each pulse thus being allocated only to a relatively small volume.

1 Claim, 1 Drawing Figure

US Patent   Sept. 23, 1975   3,906,793
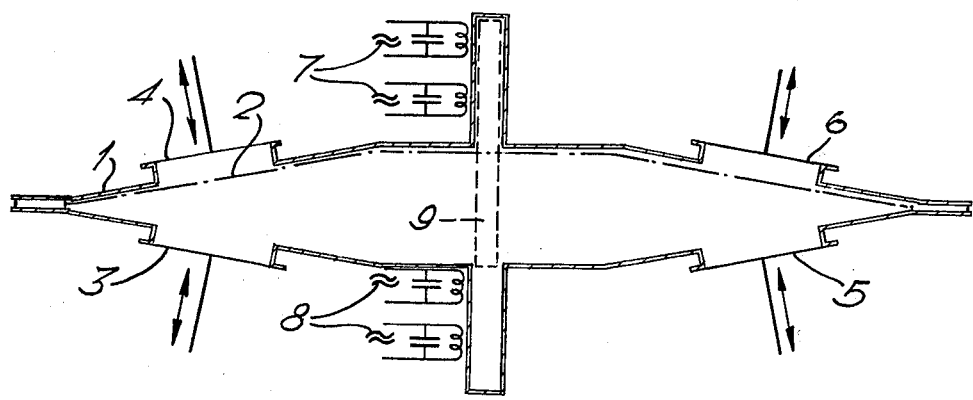

FLOW METER

This invention relates to a flow-meter with a reciprocating diaphragm displacement unit which is provided directly with an impulse transmitter for the production of impulses dependent on the position of the displacement unit, the impulses being capable of being fed to a counting mechanism.

Known volumetric measuring devices for liquids with small errors of measurement over a large range of delivery, such as are used for example in petrol pumps, usually cooperate with mechanical counting mechanisms. Occasionally electronic calculating heads are also used, to which the counting impulses from an impulse transmitter are fed. These cooperate with a rotating part of the counting mechanism or of the crank rod connected with the measuring mechanism. With these measuring devices the moving parts of the counting mechanism and the piston rod are driven from the measuring piston under the influence of the liquid pressure. The greater the power required for the drive, the greater is the error of measurement. Thus measuring devices are required that have a minimum drive force for the counting mechanism. One possibility for reducing this force is to replace the mechanical counting mechanism by an electronic calculating head. However, it is still required to find a transmission of impulses which is proportional to the volume flow. This proportionality is achieved in the known measuring devices by the use of a plurality of measuring pistons, the volumetric streams supplementing each other to form a more or less constant flow stream, by operating on a joint crank drive connected with the impulse transmitter.

Thus it is desirable to have a flow meter having a high degree of accuracy in that the displacement unit is relieved of the drive force of following members (crankshaft, counting mechanism) and which on the other hand manages with a small number of measuring chambers possibly with only one.

According to the invention there is provided a flow-meter comprising a reciprocating membrane displacement unit having an impulse transmitter adapted to produce impulses dependent on the position of the displacement unit, the impulses being fed to a counting mechanism, the impulse transmitter being capable of producing a plurality of impulses per working stroke of the displacement unit.

In this way it is possible, despite the use of comparatively large measuring chambers, to produce a plurality of counting impulses, each of which is allocated only to a small measuring volume which represents a fraction of the total volume of the measuring chamber.

The invention lies in the fact that it is possible to achieve an accurate measurement of volume because in each case after a number of possibly not very accurate counting impulses which are allocated to the intermediate positions of the membrane, the impulses allocated to the end positions of the membrane repeat themselves, and their distance from one another represents an accurately defined partial volume, namely the capacity of the measuring chamber. The measuring volume between the measuring impulses allocated to the extreme positions of the membrane can be determined with an accuracy which is far greater than for example, the accuracy required in petrol pumps. There is therefore for the impulses located between these impulses a tolerance reserve which makes it possible to dispense with a considerable degree of accuracy of these intermediate impulses.

Advantageously the displacement unit is connected with a part extending in the direction of movement of the displacement unit and which cooperates with a plurality of sensors or is provided with a plurality of impulse units. This extended part extends advantageously on both sides of the displacement unit, a plurality of sensors or impulse units staggered in relation to one another being provided on both sides.

The invention will now be described, by way of example only, with reference to the accompanying drawing.

This shows a diagrammatical cross section through a measuring chamber which consists of a housing 1, inside which a membrane 2 is clamped centrally between the flanges of the two housing sections in a known manner. The housing possesses on each side of the membrane, an inlet valve 3, 4 and an outlet valve 5, 6. The internal shape of the housing is chosen in such a way that the membrane can rest with the whole of its surface along the sides of housing containing the valves. The inlet valves are positively controlled; they can, for example, be opened by means of magnets and be closed by the force of a spring.

The outlet valves can also be positively controlled, but more advantageously they can be designed as non-return valves.

The membrane is provided centrally with a rod 9 arranged at right angles to the plane of the membrane and which rests on projections in the housing.

During operation of the flowmeter, rod 9 draws the membrane 2 from one side of the chamber to the other. This action enables liquid to be pumped through from inlet valve 3 to outlet valve 5. Activation of valves 3, 5 is achieved by passage of a fluid through valves 4, 6 on the opposite side of the membrane. Suitable sensors 7, 8 are arranged on the projections of the housing and these are influenced by the passage of the rod 9. It is possible to use any desired type of sensor which is capable of determining the particular position of the rod 9 or of transmitters connected with the rod 9, for example devices operating magnetically, inductively or capacitively. Digital transmitters are preferred, for example photo-transistors.

As can be seen from the Figure, the rod is designed so as to have double acting sensors 7 and 8 being arranged on both sides. The sensors are staggered on the one side in relation to the central distance in relation to the sensors on the other side, so that one obtains an impulse interval corresponding to half the distance between the sensors.

The control of the inlet valves 3, 4 and possibly also of the outlet valves 5 and 6 takes place according to those impulses which indicate the end position of the membrane.

The membrane and the rod 9 can be designed with a low weight and low frication so that the accuracy of measurement in regard to the measuring impulses determining the extreme positions of the membrane is very high. For the reasons stated above, the adjustment of the remaining impulse transmitters does not need to be carried out with the same accuracy.

I claim:

1. A flowmeter comprising: a housing defining a chamber suitable for containing a liquid; a membrane displacement unit within said housing, said unit including a membrane mounted in said housing across said chamber and dividing said chamber into two sections, the membrane being adapted to conform to the internal shape of said chamber section when subject to fluid pressure; each section having a fluid inlet valve and a non-return outlet valve, the inlet and outlet valve on opposite sides of said membrane being adapted to inflate and deflate the membrane to sweep the volume of the chamber; said displacement unit further including a rod extending outwardly on both sides of the membrane for movement in the direction of membrane movement; a plurality of impulse sensors located in staggered relationship to one another on both sides of the membrane to cooperate with said rod to produce impulses at predetermined positions of said membrane, each impulse being thus allocated to a fraction of the chamber volume and the impulses at the two extremes of movement of the membrane indicating the volume of the chamber; and counting means operatively coupled to the sensors to record said impulses.

* * * * *